May 25, 1926.  1,586,071

H. L. COOKE

METHOD OF AND APPARATUS FOR TAKING PHOTOGRAPHS

Filed June 28, 1922    5 Sheets-Sheet 1

INVENTOR
H. L. Cooke
BY
his ATTORNEYS

May 25, 1926. 1,586,071
H. L. COOKE
METHOD OF AND APPARATUS FOR TAKING PHOTOGRAPHS
Filed June 28, 1922 5 Sheets-Sheet 5

Patented May 25, 1926.

1,586,071

UNITED STATES PATENT OFFICE.

HEREWARD LESTER COOKE, OF PRINCETON, NEW JERSEY, ASSIGNOR TO AERO SURVEY CORP., A CORPORATION OF DELAWARE.

METHOD OF AND APPARATUS FOR TAKING PHOTOGRAPHS.

Application filed June 28, 1922. Serial No. 571,510.

This invention relates to cameras and particularly to cameras suitable for taking time exposures of objects moving relatively to the camera. The invention is thus of particular importance for securing photographs from aircraft, particularly photographs suitable for purposes of photogrammetry.

One of the prime objects of the invention consists in rendering lenses covering an extremely wide field of view suitable for aerial photography. Such wide angle lenses being slow in action, require a considerable period of exposure for the production of a properly exposed photograph.

The present invention provide means whereby the image of the landscape which is being photographed may be held still on the sensitized medium for a period of time, even though the aircraft from which the exposure is being made is in motion. With this object in view, the invention contemplates to provide a camera the sensitized medium and lens of which may be moved in relation to each other in the direction of line of flight of the aircraft, the speed and direction of the movement being such that the movement of the image—which is caused by the apparent shifting of the landscape—is exactly compensated, so that during the time of exposure the image remains fixed on the sensitized medium. A well defined photograph of extremely wide angle and long exposure may thus be obtained.

The invention further contemplates the provision of a telescope associated with the camera and in which the cross-hairs and objective are subjected to the same relative motion as the sensitized medium and objective of the camera. The purpose of this telescope is to enable the operator to make the necessary adjustments to bring about the desired relative motion above referred to. When the desired adjustments have been made, the image of the landscape as viewed through the telescope will remain fixed with reference to the cross-hairs of the telescope, and the operator may then proceed to take the photograph.

The invention further provides gyrostatic mechanism whereby the camera may be placed under neutral gyrostatic control so that the axis of the camera will not be effected by small irregularities in the flight of the air-craft.

The invention further contemplates a mechanism whereby the sensitized medium or film of the camera is carried by supports independent of the said gyrostatic system, so that when the film is passed lengthwise through the camera—as by being unrolled from one reel and wound upon another reel—the position of the center of mass of the gyrostatic system will not be disturbed by the change of weight from one reel to the other.

A good understanding of the above and certain other features and objects of the invention may now be had from the following description of certain specific forms of embodiment thereof, reference being had to the accompanying drawings, in which.

Similar characters of reference designate similar parts in each of the several views.

The present form of instrument as illustrated in Figures 1 to 6, consists of a mounting comprising a ring 1, which by means of supports 2, is secured to the floor 3 of the aircraft. Suitable shock-absorbing devices such as springs are preferably interposed in supports 2. These devices, however, are not illustrated in the drawing, to avoid unnecessary confusion.

Figure 1:
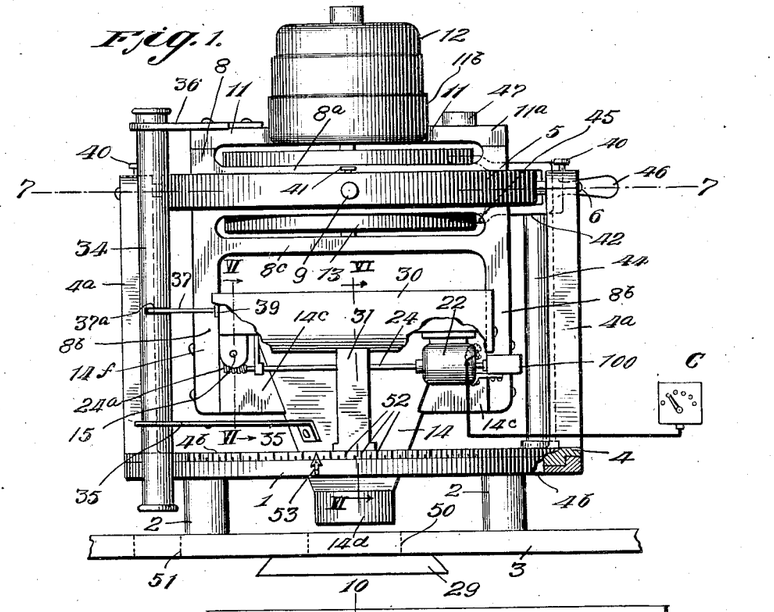
Figure 1 is a view illustrating the camera and its mounting in front elevation.

Revolvably mounted on ring 1 is a member 4 comprising a pair of uprights $4^a$ and a ring portion $4^b$, which, as illustrated in section in Figure 1, is arranged to revolve on ring 1. A gimbal frame 5 is rotatably mounted on the uprights $4^a$ by means of trunnions 6. The axis 7—7 of these trunnions constitutes what will be referred to as the transverse gimbal axis. A member 8 is rotatably mounted in gimbal frame 5 on trunnions 9, the axis 10—10 of which constitutes what is herein referred to as the fore and aft gimbal axis, which intersects with the transverse gimbal axis 7—7. The member 8 is composed of a ring $8^a$ having depending extensions $8^b$ joined by a transverse support $8^c$, all the parts of member 8 forming a rigid unit.

Across the upper ends of extensions $8^b$ is secured a transverse member 11 which consists of arms $11^a$ integral with a cup $11^b$ in which is firmly secured a high speed motor 12. The axis of this motor is normal to the gimbal axes 7—7 and 10—10 and preferably passes through their point of intersection.

A gyrostat wheel 13 is mounted in member 8 between the transverse support $8^c$ and the member 11, so as to revolve within the ring $8^a$. The center of mass of the wheel is preferably but not necessarily at the intersection of the gimbal axes 7—7 and 10—10. The axis of rotation of the wheel is coincident with that of motor 12, a universal coupling, not shown, being interposed between the shaft of motor 12 and the axle of the gyrostat wheel, so that the armature and the wheel rotate as a unit. The bearings which rotatably support the motor armature and the gyrostat wheel 13 are preferably of anti-friction type so as to reduce the frictional losses.

Figure 8:
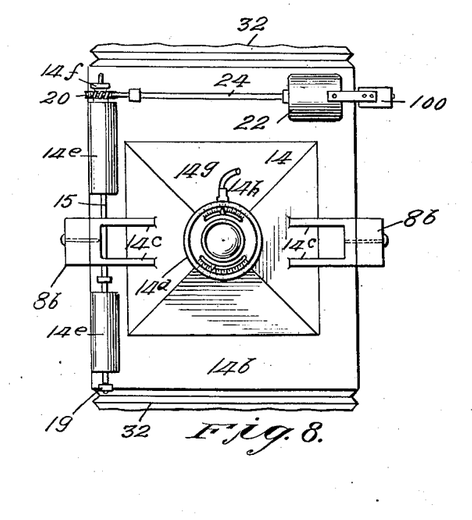
Figure 8 is a bottom plan view of the camera.
Figure 16:
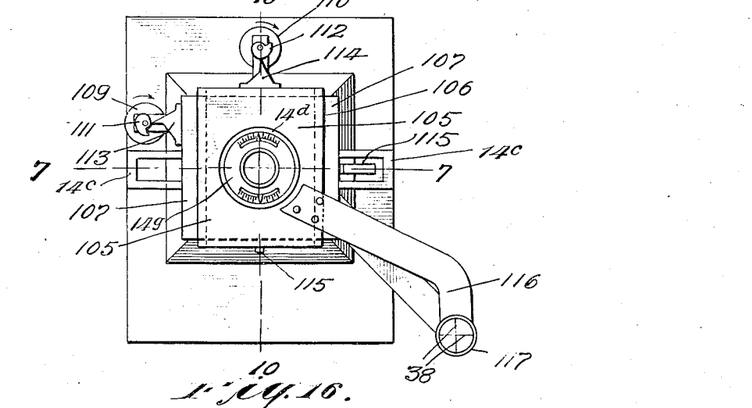
Figure 16 is a view showing a bottom plan view of Figure 15.

The camera 14 (Fig. 5) consists of a body $14^a$ having a back $14^b$ and side extensions $14^c$, by means of which it is firmly secured to and supported by the extensions $8^b$ of the member 8. The camera lens, shown in Figs. 8 and 16, is placed within the lens guard $14^d$ and preferably has its axis coincident with the axes of the motor 12 and gyrostat wheel 13, which common axis will hereinafter be referred to as the camera axis. A shutter $14^g$ (Fig. 8) is provided in the lens guard, and mechanism $14^h$ comprising a flexible cord or other suitable device is provided for actuating the same.

Figure 7:
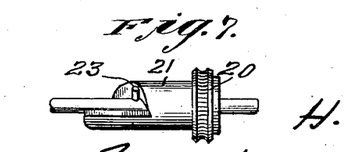
Figure 7 is a perspective view of the cam indicated in Figure 6.

The camera back $14^b$ (see particularly Fig. 6), has two hollow pockets $14^e$, and a rod 15 parallel to the fore and aft gimbal axis 10—10 extends through the pockets $14^e$ and through a lug $14^f$, and is free to slide longitudinally therein. A single-turn screw cam 21 (Fig. 7) is firmly secured to the worm wheel 20 and is thus free to rotate with the worm wheel about rod 15. A pin 23 firmly secured in the rod 15 is maintained in firm sliding contact with the screw-shaped end of cam 21 by the action of the spring 19. Rotation of rod 15 is prevented by means of an arm $15^a$ rigidly mounted thereon (see Figure 6), and having an opening through which extends a pin $15^b$ mounted in one of the lugs $14^e$ of the camera body. By virtue of this connection, arm $15^a$ is free to slide on the pin $15^b$ so as to permit of the reciprocal movements of the rod. Rotation of the rod, however, is prevented.

A motor 22, the speed of which may be controlled by electrical apparatus, indicated diagrammatically by C in Figure 1, is secured to the back $14^b$ of the camera in such manner that the shaft 24 thereof operates the worm $24^a$ and thus causes rotation of the worm wheel 20. The effect of this rotation is to bring about reciprocation of rod 15 by virtue of the screw cam 21, this cam being arranged so that when the motor 22 is operated at a constant speed, a slow uniform leftward motion is communicated to the rod 15, as viewed in Fig. 5, to the end of the motion caused by contact of the pin 23 with the cam surface of the cam screw 21, whereupon the rod is snapped back to its extreme right position by means of spring 19. The cycle of movement is then repeated. The speed of revolution of motor 22 is indicated by a suitable indicating device 100 connected to the motor shaft and mounted on the supporting member $8^b$; and the number of reciprocations of the rod 15 is indicated by the same indicating device 100, which is a form of combined speed indicator and revolution counter.

A film support 25 with its plane normal to the camera axis, is provided with a pair of lugs 26 through which the rod 15 is fitted, relative motion between the film support and the rod being prevented by a set screw 27. A third lug 28 on the film support 25 at the opposite side of the camera from the lugs 26, has a flat lower end so that this side of the film support is slidingly supported on a rod 29 arranged parallel to the rod 15 and secured to the camera back 14<sup>b</sup>. It will thus be seen that when the motor 22 is operated at constant speed, the rod 15 and film support 25 will undergo a uniform motion of translation parallel to the plane of the film support and normal to the axis of the camera, this uniform motion being interrupted at intervals, as hereinbefore explained, by the return of the film support 25 to its original position. By adjusting the speed of the motor, the above-mentioned uniform motion of the film support may be regulated to the speed desired.

Two film boxes 30 rigidly supported on the member 4 by means of supports 31, are arranged to contain reels 30<sup>a</sup> for the exposed and unexposed film. Flexible light-tight bellows 32 enable the film to be passed through the top 14<sup>b</sup> of the camera from one film pocket 30 to the other, the film passing through the grooves 33 (Figure 5), in the film holder and occupying the position shown at the dotted line 34 in the focal plane of the camera lens. It should here be noted that by virtue of the above-described arrangement the center of mass of the gyrostatic system is prevented from being changed as the film is passed from one film box to the other. Also that the flexible bellows 32 will not impose any appreciable angular constraint about the axes 7—7 and 10—10 between the gyrostatically stabilized camera 14 and the fuselage of the aeroplane, provided, as will in general be the case, that the aeroplane is flying comparatively steadily during the photographing of a strip of territory. For obvious reasons, these are important features of the present form of construction.

Figure 12:
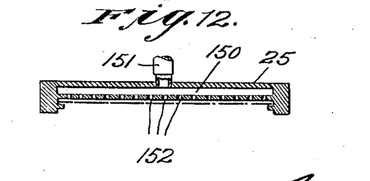
Figure 12 is a detail view showing a suction back mechanism whereby the film is secured to the film support 25.
Figure 13:
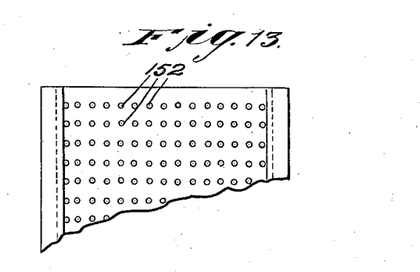
Figure 13 is a bottom plan view of Figure 12.

The film holder 25 is provided with a device well known in the art, such as a suction back, which insures that the part of the film in the film support 25 shares the hereinbefore-described intermittent motion of the said support. Such mechanism is illustrated in Figs. 12 and 13, in which the holder 25 is shown as provided with an interior hollow space 150 which is connected by a flexible tube 151 to a source of suction. The lower surface of the holder is provided with a number of perforations 152 which communicate with the chamber 150 and which therefore cause the film to be drawn snugly against the surface of the holder, whenever the suction is applied. Control of the suction may be effected by a suitable valve (not shown) located in the tube 151.

I further provide mechanism indicated by handles 30<sup>b</sup> for winding the film from the one film box to the other such mechanism being preferably adapted automatically to advance the film by the proper amount to bring an unexposed portion into the field of view of the photographic objective, and also mechanism for providing sufficient slack in the film on both sides of the film holder to take up the intermittent motion. The latter mechanism, being well known in connection with moving picture machines, is not illustrated, in order to prevent unnecessary complications of the drawing.

A level 47, preferably filled with a very viscous liquid, such as glycerine, is mounted on transverse member 11<sup>a</sup> to indicate when the average position of the camera axis is approximately vertical over an interval of time. Any other suitable device for indicating verticality may be employed.

A telescope 34, arranged preferably with its axis parallel to the camera axis, is rigidly attached to the camera body 14<sup>a</sup> by means of the bracket 35, and to the transverse member 11<sup>a</sup> by means of the bracket 36, so that the telescope and camera axes are maintained in fixed relation.

Figure 5:
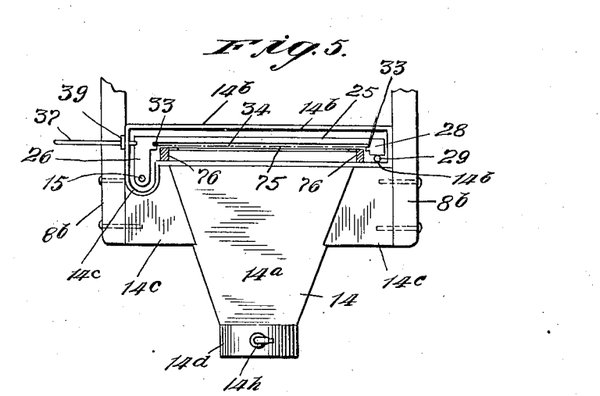
Figure 5 is a detail view, partly in section, showing the movable film support of the camera.
Figure 6:
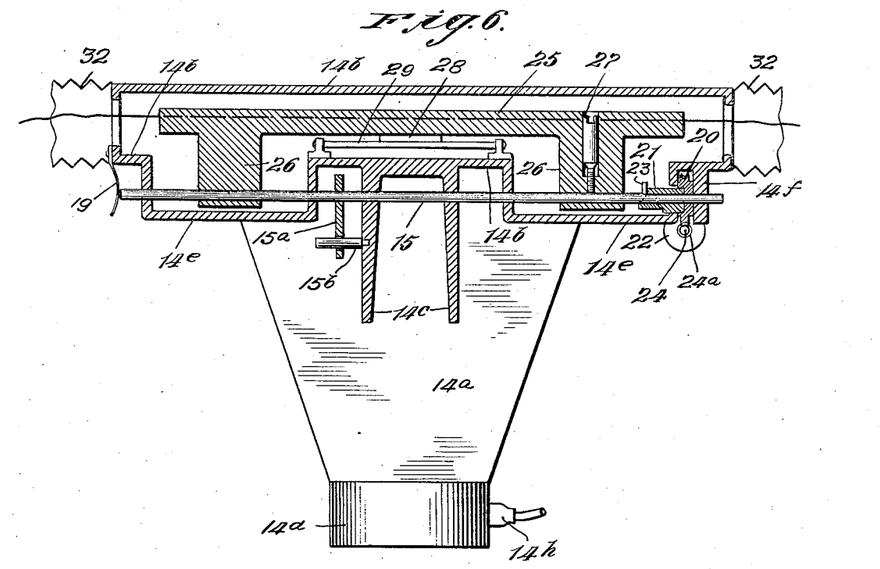
Figure 6 is a view showing a section of Figure 1, on line VI—VI, looking in the direction of the arrows.
Figure 9:
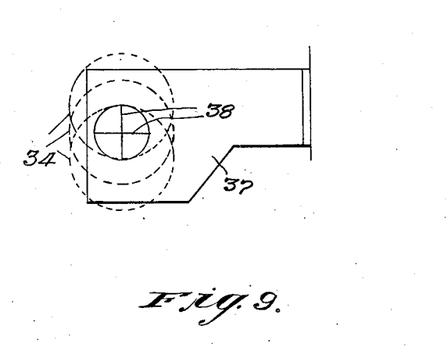
Figure 9 is a view illustrating the bracket 37 carrying the cross-hairs of the telescope and illustrating the range of movement thereof with relation to the telescope, various positions of which are indicated in dotted lines.

The object glass of the telescope 34 is chosen with an equivalent focal length identical with that of the camera lens. A bracket 37 passes slidingly through a slot 37<sup>a</sup> in the walls of the telescope 34 transversely to the axis thereof, and carries cross wires 38 (Figs. 2 and 9) in the focal plane of the object glass of the telescope, said wires being arranged parallel to the axes 7—7 and 10—10 of the camera mounting. The bracket 37 is rigidly attached to one of the lugs 26 of the film holder 25, as shown in Figure 5, and passes slidingly through a slot, parallel to the rod 15, in the wall of the camera back 14<sup>b</sup>, the sliding connection with said wall being made light-tight by suitable means, such as the flange 39 shown in Figs. 5 and 1 and 3. The intermittent motion imparted to film support 25 by the motor 22 is thus shared by the cross-hairs 28, so that an operator viewing through the eyepiece of the telescope 34 an object to be photographed, may determine any movement of the image cast by the camera lens on the film in the film holder 25 by observing the corresponding movement of the image formed by the telescope object glass relative to the cross wires 38. When the telescopic image is still with reference to the cross wire 38, the photographic image is at rest on the film, and a comparatively long duration exposure will result in an unblurred image.

The design of the instrument is so arranged that the center of mass of the gimbal frame 5 and of the moving system supported by the trunnions 9 lies accurately at the intersection of the gimbal axes 7—7 and 10—10. The camera then forms part of a gyrostat system under neutral accelerational control. Means for adjusting the frictional forces on the bearings of the trunnions 6 and 9 are provided in the form, for example, of friction screws 40 and 41, as shown. The frictional forces produced by these screws are so adjusted that chance nutational disturbances imparted to the gyrostat system will be rapidly damped out. This frictional control is not to be made so great, however, that the small irregularities in the motion of the aircraft will result in appreciable precessional disturbances being imparted to the gyrostatic system. Experiment has shown that this is feasible.

A clamping device 42, (Figs. 2 and 4) is mounted securely on the ring 4 and consists of the standard 44 in which a handle 46 and jaws 45 are rotatably mounted. By means of the handle 46 the jaws 45 may be engaged or disengaged with the rings 5 and 8ª. The camera axis will thus be fixed with respect to the aircraft when the jaws are in the engaged position, and will be under neutral gyrostatic control when the jaws are disengaged. The clamping jaws 45 are intended to lock the position of the camera with respect to the aircraft when the latter is "banking" on turns, or encountering air "bumps", and also to bring the camera axis back to the approximate vertical when it becomes displaced from any cause.

The camera is fixed in the aircraft with the fore and aft gimbal axis 10—10 in the fore and aft direction, and with the spring 19 toward the bow of the aircraft. In this position, the uniform, but discontinuous, motion of the film holder 25 is in a direction forward with respect to the aircraft.

Figure 2:
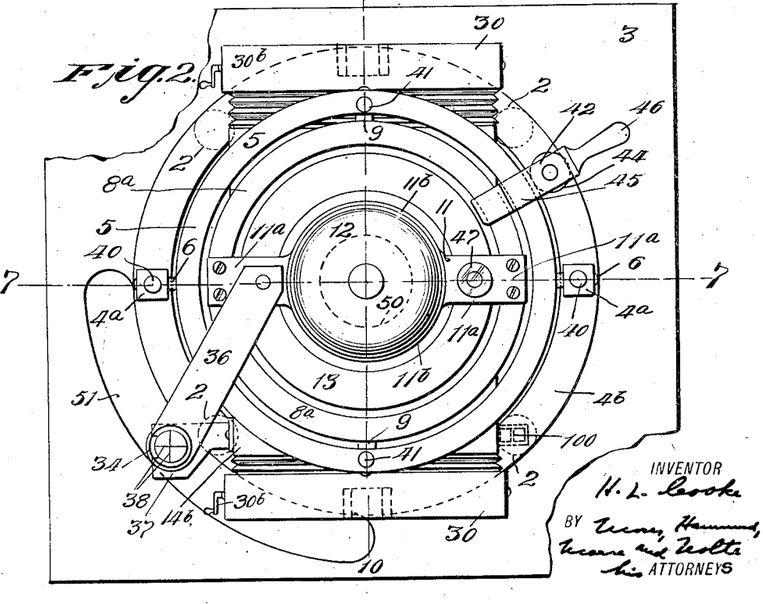
Figure 2 is a plan view of Figure 1.
Figure 3:
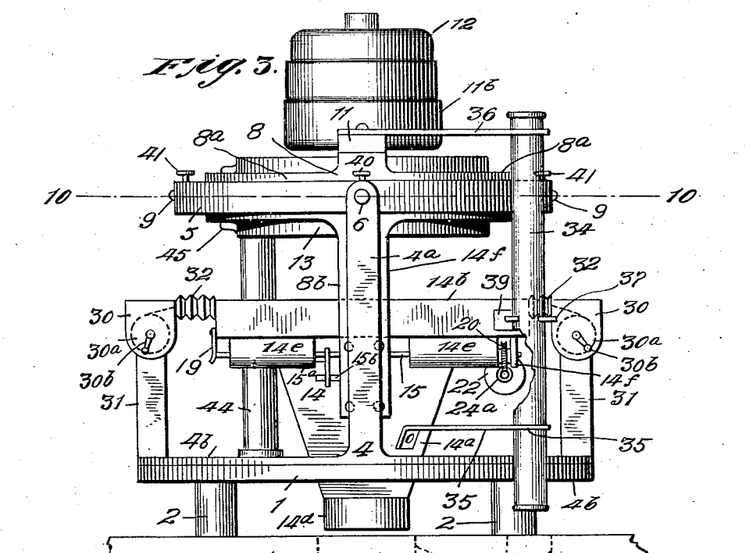
Figures 3 and 4 are left and right side elevations of Figure 1.
Figure 4:
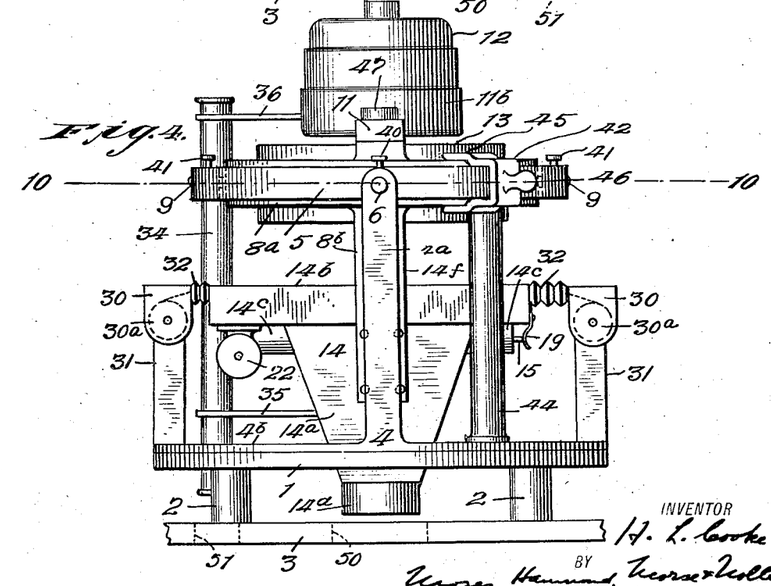

The floor of the aircraft is provided with apertures 50 and 51 (Figs. 1 and 2) to allow the camera and telescope unobstructed views of the landscape, the shape of aperture 51 being arcuate as indicated in Fig. 2, to allow for the angular shift of the apparatus on supporting ring 1.

The operation of the camera will now be described. With the aircraft flying steadily on its course and the motor 12 and gyrostat wheel 13 operating at high speed, the operator looks through the telescope 34 and since the direction of the axis of the telescope is approximately fixed in space, observes that there is relative motion between the cross-hairs 38 and the image of the ground. He then angularly shifts the whole apparatus, which is mounted rotatably on the ring 1, until this relative motion occurs parallel to the fore and aft cross-wires of the telescope. He then starts the motor 22 and so controls its speed that the cross wires 38 share the steady forward drift of the telescopic image of the ground to be photographed, the cross-wires intermittently snapping back, under the action of the spring 19, cam wheel 2 and motor 22, so that the intersection of the cross-wires 38 takes up, at regular intervals, new points of coincidence with the telescopic image of the landscape. When the angular adjustment of the apparatus on the ring 1, and the speed of the motor 22 have been adjusted to secure a satisfactorily steady coincidence between the moving cross wires and the moving telescopic image, the camera is in adjustment and a time exposure of the film may be made, care being taken that the cross-wires are approximately in the middle of their run when the exposure is made, to avoid the danger of the film snapping back during the exposure.

Consideration will show that when the camera is in adjustment for making an exposure, the fore and aft gimbal axes must be parallel to the line of flight of the air-craft relative to the ground, so that if the ring 4ᵇ has marked on it graduations 52 cooperating with a pointer 53 on the ring 1, Fig. 1, the line of flight relative to the fore and aft axis of the aircraft may be determined. The pilot is able, by means of his compass, to tell the magnetic bearing of the fore and aft axis of the aircraft, so that if in addition the reading of the pointer 53 on the scale 52 is communicated to him, or automatically transferred to the compass by suitable mechanical means, not shown, he may ascertain at any instant the magnetic bearing of his line of flight relative to the ground, and so may adjust the line of flight to any prearranged magnetic bearing, provided the operator at the camera continues to adjust the angular position of the ring 4ᵇ in the ring 1 so that there is no transverse motion, parallel to the transverse gimbal axis 7—7, of the telescopic image of the ground relative to the cross wires 38.

Also, it may be shown that if R is the ratio of the frequency of reciprocation of the rod 15 to the speed of revolution of the motor 22, determined by intervening gears; d the distance of travel of the cross wires 38 between successive discontinuities of their motion, determined by the pitch of the screw cam 21; f the equivalent focus of the telescope and camera objectives; h the height at which the aircraft is flying above the ground of which the telescopic image is stationary with respect to the moving cross wires 38; and N the revolutions per second of the motor 22; then the ground speed of the air craft is given by the expression $$N\left(\frac{R.h.d.}{f}\right).$$

From this expression it is seen that if a standard height h for navigation of the aircraft be chosen, the speed indicator portion of the combined speed indicator and revolution counter 100 connected to the shaft of the motor 22 may be calibrated to give the ground speed of the aircraft in, for instance, miles per hour, this speed being proportional to N which is the only variable in the expression, if the height $h$ is kept constant, since R, $d$ and $f$ depend on the construction of the apparatus only. Furthermore, it may be seen that the ground distance traversed between successive discontinuities in the motion of the rod 15 is given by the expression $$\frac{h.d.}{f},$$

so that the revolution counter portion of the combined speed indicator and revolution counter 100, when suitably geared, may be made to indicate the ground distance traversed, in any suitable unit, say miles.

It thus appears that the apparatus described may be adapted readily to determine the ground distance traversed by the aircraft, and the line and speed of flight, thus affording the pilot all the information necessary to navigate aircraft by the method of dead reckoning.

Furthermore it should be noted that if exposures made with this camera are made with intervals of a chosen number of intermittent motions of the shaft 15, indicated on the counter 101, the photographs will be evenly spaced on the landscape. Also they may be taken with the aircraft flying on a predetermined magnetic course, as hereinbefore explained, so that evenly spaced photographs may be taken covering a given tract of land in a predetermined manner, a matter of the utmost importance in practice.

One of the most important features of the present invention consists in the fact that the present type of camera permits the employment of slow photographic lenses covering an extremely wide field of view. It will be necessary in using such lenses, to have the aperture 50 in the floor of the aircraft, entirely open, and not covered with plate glass or mica, such as may be employed when moderate angle views are to be taken. The reason for this is that the rays forming the marginal portions of extreme angle views will meet the plate glass or mica shield at very oblique angles, and will suffer a prohibitive loss in intensity. For this reason a wind plough 29, such as is indicated in Fig. 1, should be provided, to minimize disturbing gyrostatic effects due to the violent rush of air past the aperture 50.

Also if extreme angle views are to be taken through a color filter, this filter should be incorporated as a unit with the camera lens, to avoid the loss of light in the oblique rays due to the introduction of additional reflecting and refracting surfaces. Methods of incorporating the filter with the lens are described in my co-pending application for Letters Patent on color filters, Serial Number 533,805 dated February 3, 1922.

Figure 10:
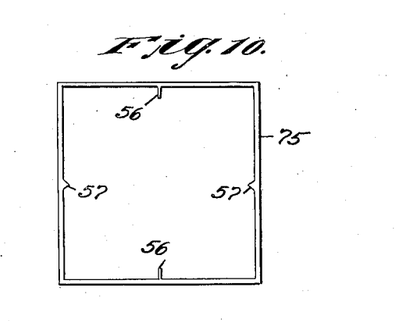
Figure 10 is a detail view of the frame 75 carrying identifying registration marks for the film.
Figure 11:
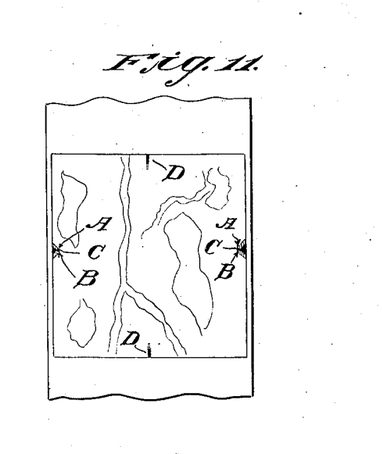
Figure 11 is a view showing a positive print from a film, illustrating the registration marks appearing thereon.

If the photographs are to be used for photogrammetry it will be necessary to know the average position of the camera lens relative to the film during exposure. For this purpose I provide a frame 75 (Fig. 10) which is mounted in the interior of the camera on supports 76 (Fig. 5) close to the surface of the film (indicated at 34). The frame is fitted with narrow registration indicators 56. The line joining these indicators bisects the rectangle formed by the frame, in the fore and aft direction. The frame is also provided with pointed marks 57, the line joining which bisects the rectangle in the transverse direction. The axis of the camera lens meets the intersection of the lines joining the marks 56 and the marks 57, respectively. During an exposure the film will move relatively to the frame 75 which is fixed in the camera. The side indicators 57, therefore, will leave blurred images on the film, as indicated in Fig. 11, in which the distance of movement of the indicator extends from the apex point A to the apex point B. The apex C of the part of the film, exposure of which is totally prevented by the side indicators, however, will be well defined. The indicators 56 will produce sharply defined marks D on the exposed film, which marks together with the apex marks C will serve in an obvious manner to locate the average position, during exposure, of the intersection of the camera lens axis with the film.

It will have been observed that in the foregoing form of embodiment of the invention the desired relative motion between the camera objective and sensitized medium is produced by maintaining the lens or objective in fixed position and moving the sensitized medium. It is within the scope of the invention, however, to produce the desired relative motion by maintaining the sensitized medium in fixed position and impressing the motion on the lens or objective, as described below.

It will also have been observed that in the foregoing form of embodiment the direction of the relative motion may be adjusted simply by turning the camera on its rotatable mounting, the angle through which the camera is turned being such that the direction of the motion is caused to be parallel to the line of flight. Instead of providing such rotatable mounting, however, the camera may be mounted in the aircraft in fixed position and the desired parallelism of the said relative motion to the line of flight may be secured by adjusting the direction of the said motion with respect to the camera.

Figure 14:
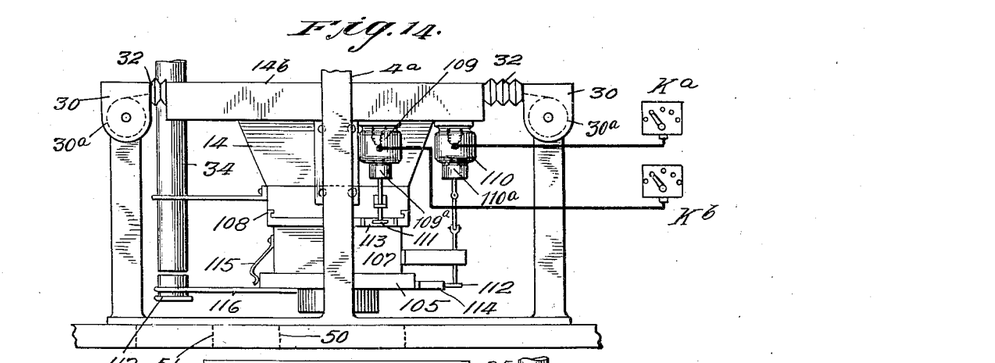
Figure 14 is a view similar to Figure 4, showing a modified form of the apparatus, part of the mechanism, namely the gimbal mounting and the gyrostat, having been omitted for sake of simplicity.
Figure 15:
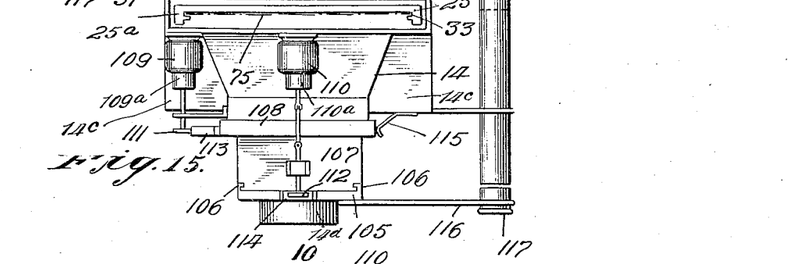
Figure 15 is a view showing the camera and telescope of Figure 14 in right side elevation.

One manner in which this may be accomplished, is by impressing two movements at right angles to each other simultaneously on the sensitized medium or camera lens and adjusting the speed of each movement so that the resultant impressed motion is in the desired direction. Such a form of embodiment is illustrated in Figures 14, 15 and 16, in which the camera 14 is mounted in a gimbal frame (not shown) corresponding in all particulars to that of the previous form of embodiment, with the exception, however, that the rotatable mounting comprised of rings 1 and 4 of the previous embodiment is omitted, so that the camera cannot be rotated about the vertical axis. The mechanism for impressing intermittent motion on the film support of the camera is omitted and an ordinary stationary film carrier 25ª is substituted therefor. If desired an ordinary plate and plate holder may be used instead of the film.

The objective or lens of the camera is fixed in a member 105 which is provided with tongues 106 whereby the same is mounted in a member 107 in such manner as to be capable of sliding movement in the direction of the fore and aft gimbal axis 10—10. The member 107 is similarly secured to the body of the camera 14 by tongues 108, so as to be capable of movement along the transverse gimbal axis 7—7. Motors 109 and 110 are mounted on the camera body and provided with cams 111 and 112 cooperating with cam followers 113 and 114, respectively, provided on members 107 and 105. Leaf springs 115 are provided to hold the cam followers in engagement with their cams and these cams are so formed that when they are made to revolve at a uniform speed, each member 105 and 107 is impressed with a uniform intermittent motion. The speed of each motion may be adjusted independently of the other by means of electrical controlling mechanism $K^a$ and $K^b$ in the motor circuits. The motion thus impressed on the objective or lens mounted in the member 105 will be the resultant of two components, these components being adjustable independently of each other so that any desired resultant speed and direction of movement may be produced. Owing to the discontinuities of cams 111 and 112, the resultant movement will be interrupted at regular intervals as each of the cams reaches its point of discontinuity, so that the objective will snap back in one direction or the other, as the case may be, and thereupon resume its uniform motion.

The telescope in the present form of embodiment is provided with fixed cross-hairs, and the objective or lens 117 of the telescope is made movable. The telescope lens is mounted in a bracket 116 fixed to the member 105 so that the movement to the objective of the telescope is the same as that impressed on the objective of the camera.

The manner of using the present form of embodiment of the invention will now be readily understood. After the motor 12 and gyrostat wheel 13 have been set into rapid rotation, so that the camera is placed under neutral gyrostatic control, the operator views the landscape through the telescope and notices the drift of the image thereof past the cross-hairs. He then starts one of the motors, say 109, and adjusts its speed until the drift along one of the cross-hairs, 38, is eliminated and thereupon starts the motor 110 and adjusts its speed until the drift along the other of the cross-hairs, is eliminated. If necessary, he repeats the adjustments until the image of the landscape is entirely stationary relative to the cross-hairs, and, therefore, relative to the sensitized medium. He then makes the time exposure. It should be noted, however, that owing to the fact that the instantaneous angular positions of cams 111 and 112 will ordinarily be subject to continual change, the objectives will snap back along the two axes at different periods, so that care must be taken that such reversal will not take place during the time interval of an exposure.

This form of camera may be adapted for the use of plates instead of films. It is obvious in both forms of camera shown in the drawings that the grooves 33 in the film support 25 may be enlarged sufficiently to receive an ordinary photographic plate holder. In the first form of camera exhibited, the plate holder inserted in the enlarged grooves 33 of the film support 25 will share the intermittent motion of the said film support, while in the form of camera shown in Figs. 14, 15 and 16, the plate holder will remain at rest, the suction back being of course omitted in both forms.

It will be observed that one of the important features of the invention consists in the fact that the relative motion between the objective and the sensitized medium of the camera is periodically interrupted to effect the return of the said objective and sensitized medium to a given relative position. In view of this feature, exposures may be taken at any desired intervals of time, so that it will be possible to secure overlapping photographs, showing parts of the same territory on adjacent exposures, a point of utmost importance in aerial photography, especially when the photographs are to be used for photogrammetry. Moreover, this feature of the invention renders it possible to transmit the same relative motion to the optical members of the sighting device, so that the photographer is enabled to determine whether or not the adjustment of the apparatus is such that the image is stationary on the sensitized medium. Further advantages arising from this feature of the invention consist in the fact that the film may be held perfectly flat by means of the suction back and that plates may be used as well as films.

Although I have herein shown and described only two specific forms of construction embodying the invention, it will be understood that many changes and modifications may be made therein without departing from the spirit and scope of the invention, it being my intention to claim the same broadly in whatever form its principles may be employed.

What I claim is:

1. In combination, a camera adapted for use with an objective and sensitized medium, means for producing during exposure a relative motion between said objective and sensitized medium in a plane normal to the axis of said objective, and means for adjusting the direction of said relative motion in said plane.

2. In combination, a camera adapted for use with an objective and sensitized medium, means for producing during exposure a relative motion between said objective and sensitized medium in a direction normal to the axis of said objective, and a rotatable mounting for said camera whereby the angular position of said camera is adjustable about its own axis.

3. In combination, a camera adapted for use with an objective and sensitized medium, means for producing during exposure a relative motion between said objective and sensitized medium in a plane normal to the axis of said objective, means for adjusting the speed of said relative motion, and means for adjusting the direction of said relative motion in said plane.

4. In combination, a camera adapted for use with an objective and sensitized medium, means for producing during exposure a relative motion between said objective and sensitized medium in a direction normal to the axis of the said objective, means for adjusting the speed of said relative motion, and a rotatable mounting for said camera whereby the angular position of said camera is adjustable about its own axis.

5. In combination, a camera adapted for use with an objective and sensitized medium, means for producing during exposure a relative motion between said objective and sensitized medium in a direction normal to the axis of said objective, and means for periodically returning said objective and sensitized medium to a given relative position.

6. In combination, a camera adapted for use with an objective and sensitized medium, and mechanism for producing during exposure a relative motion between said objective and sensitized medium in a direction normal to the axis of said objective, said mechanism comprising means whereby said objective and sensitized medium are periodically returned to a given relative position.

7. In combination, a camera adapted for use with an objective and sensitized medium, means for producing during exposure a relative motion between said objective and sensitized medium in a direction parallel to the focal plane of said objective, and a sighting device associated with said camera.

8. In combination, a camera adapted for use with an objective and sensitized medium, means for producing during exposure a relative motion between said objective and sensitized medium in a direction normal to the axis of said objective, a sighting device associated with said camera and comprising a plurality of optical members movable in relation to each other, and means for simultaneously impressing a corresponding relative motion on the said members of the sighting device.

9. In combination, a camera adapted for use with an objective and sensitized medium, mechanism for producing during exposure a relative motion between said objective and sensitized medium in a direction normal to the axis of said objective, said mechanism comprising means whereby said objective and sensitized medium are periodically returned to an initial relative position, a sighting device associated with said camera and comprising a plurality of optical members movable in relation to each other, and means whereby corresponding relative motions are simultaneously impressed on the said members of the sighting device.

10. In combination, a camera adapted for use with an objective and sensitized medium, means for producing a uniform relative motion between said objective and sensitized medium in a direction normal to the axis of said objective, and a mounting permitting free relative motion between the axis of said camera and the platform upon which said mounting is supported.

11. In combination, a camera adapted for use with an objective and sensitized medium, means for producing during exposure a relative motion between said objective and sensitized medium in a direction normal to the axis of said objective, and a mounting permitting free relative motion between the axis of said camera and the platform on which said mounting is supported.

12. In combination, a camera adapted for use with an objective and sensitized medium, means for producing uniform relative motion between said objective and sensitized medium in a direction normal to the axis of said objective, and a gyroscopic stabilizing device associated with said camera.

13. In combination, a camera adapted for use with an objective and sensitized medium, means for producing uniform relative motion between said objective and sensitized medium in a direction normal to the axis of said objective, and a gyrostatic stabilizing device, under neutral accelerational control, associated with said camera.

14. In combination, a camera adapted for use with an objective and sensitized medium, means for producing during exposure a relative motion between said objective and sensitized medium in a direction normal to the axis of said objective, and a gyrostatic stabilizing device associated with said camera.

15. In combination, a camera adapted for use with an objective and sensitized medium, means for producing during exposure a relative motion between said objective and sensitized medium in a direction normal to the axis of said objective, and a gyrostatic stabilizing device, under neutral accelerational control, associated with said camera.

16. In combination, a camera mounted to permit a swinging motion of its axis, a receptacle for a sensitized medium, and means constituting a light-tight passage between said camera and receptacle permitting relative motion between said camera and receptacle.

17. In combination, a camera mounted to permit a swinging motion of its axis, a receptacle for sensitized medium, and means constituting a light-tight passage between said camera and receptacle permitting relative motion between said camera and receptacle, said camera and receptacle being mounted so that they may be shifted as a unit.

18. In combination, a camera under gyrostatic control, a receptacle for sensitized medium, and means constituting a light-tight passage between said camera and receptacle permitting relative motion between camera and receptacle.

19. In combination, a camera under gyrostatic control, a receptacle for sensitized medium, means constituting a light-tight passage between the camera and receptacle permitting relative motion between the two, and means for so mounting said camera and receptacle that the same may be shifted as a unit.

20. In combination, a camera, a gimbal mounting therefor, a gyrostatic mechanism associated with said camera in said mounting whereby said camera is placed under gyrostatic control, means for passing a film through the camera, said means comprising a plurality of reels for carrying the exposed and unexposed portions of the film, respectively, and means for supporting said reels independently of said gimbal mounting, whereby the center of mass of said gyrostatic system is prevented from being disturbed when said film is passed from one reel to the other.

21. In combination, a camera adapted for use with an objective and sensitized medium, means for producing during exposure a relative motion between said objective and sensitized medium in a direction normal to the axis of said objective, and means for producing in the interval between exposures an average speed of relative motion between objective and medium different from that during exposure.

22. In combination, a camera adapted for use with an objective and sensitized medium, means for producing during exposure a relative motion between said objective and sensitized medium in a direction normal to the axis of said objective, and independent means for advancing unexposed portions of sensitized medium in the interval between exposures.

23. In combination, a camera, a suction plate for the support of sensitized medium, and means for shifting said suction plate in a direction parallel to its own plane.

24. In combination, a camera adapted for use with an objective, a suction plate, and means for producing uniform relative motion between said objective and suction plate in a direction normal to the axis of said objective.

25. In combination, a camera adapted for use with an objective, a suction plate for the support of sensitized medium, and means for producing during exposure a relative motion between said objective and suction plate in a direction parallel to the plane of said suction plate.

26. In combination, a camera adapted for use with an objective, a suction plate, and means for producing during exposure a relative motion between said objective and suction plate said means periodically restoring said objective and suction plate to a given relative position.

27. In combination, a camera adapted for use with an objective and sensitized medium, means for producing during exposure a relative motion between said objective and sensitized medium in a direction normal to the axis of said objective, and means for giving indication depending on the speed of said relative motion.

28. In combination, a camera adapted for use with an objective and sensitized medium, means for producing during exposure a relative motion between said objective and sensitized medium in a direction normal to the axis of said objective, and means for giving indication depending on the combined speed and duration of operation of said first-mentioned means.

29. In combination, a camera adapted for use with an objective and sensitized medium, means for producing during exposure a relative motion between said objective and sensitized medium without advancing the sensitized medium, independently operated means for effecting exposure of the sensitized medium, and independent means for advancing the sensitized medium.

30. The method of procuring a photograph of an object when the object and camera are in motion relatively to each other, which consists in observing the object to be photographed through a sighting device, causing the optical members of the sighting device to undergo such movement that the object as observed through the device will appear to be stationary, impressing the same movement on the optical members of the camera, and thereupon making the exposure.

31. The method of securing a photograph of an object when the object and camera are in motion relatively to each other, which consists in observing the object through a telescope comprising an objective member and cross-hair member, causing said members to move relatively to each other in such manner that the image of the moving object appears to be stationary on the cross-hair member, subjecting the sensitized member and objective member of the camera to the same relative motion, and exposing the sensitized member.

32. The method of securing a photograph of an object when the object and the camera are in motion relatively to each other, which consists in observing the object through a telescope comprising an objective and cross-hairs, causing said objective and cross-hairs to move in relation to each other so that the image of the moving object appears to be stationary on the cross-hairs, subjecting the sensitized medium and objective of the camera to the same relative motion, periodically interrupting said relative motion to return the above-named optical parts of the telescope and camera to a given initial position, and taking the exposure during a period of said relative movement.

33. Apparatus for taking photographs from moving supports such as aircraft comprising a camera, mechanism for eliminating relative motion between the image of the landscape and the optical member of the camera on which said image is produced comprising means for causing relative movement of the camera lens and the sensitized medium forming such optical member of the camera, and means for marking said sensitized medium to indicate the average position of the camera lens relative to said medium during an exposure.

34. Apparatus for taking photographs from moving supports such as aircraft comprising a camera, mechanism for eliminating relative motion between the image of the landscape and the sensitized medium on which the image is produced, and means for marking said sensitized medium during an exposure to record a condition of the exposure caused by the operation of such relative motion eliminating mechanism, and means for marking said sensitized medium during an exposure to record a condition of the exposure caused by the operation of such relative motion eliminating mechanism.

In testimony whereof I have affixed my signature to this specification.

HEREWARD LESTER COOKE.